United States Patent

[11] 3,620,906

| [72] | Inventor | George John Hannes<br>Maumee, Ohio |
|---|---|---|
| [21] | Appl. No. | ,221 |
| [22] | Filed | Feb. 25, 1970 |
| [45] | Patented | Nov. 16, 1971 |
| [73] | Assignee | Johns-Manville, FiberGlass Inc.<br>c/o Prentice Hall Corporation System, Inc.,<br>Cleveland, Ohio<br>Continuation of application Ser. No.<br>338,484, Jan. 17, 1964, now abandoned,<br>which is a continuation of application Ser.<br>No. 778,381, Dec. 5, 1958, now abandoned.<br>This application Feb. 25, 1970, Ser. No.<br>14,221 |

[54] GLASS FIBER LAMINATES AND METHOD
13 Claims, 3 Drawing Figs.

[52] U.S. Cl. ................................................. 161/203,
156/222, 161/112, 161/156, 296/137
[51] Int. Cl. ........................................................B32b 17/10,
B32b 31/08
[50] Field of Search........................................ 296/137 A;
161/112–115, 156, 203, 88, 93, 96, 227, 241, 248

[56] References Cited
UNITED STATES PATENTS

| 2,227,212 | 12/1940 | Beck | 161/241 |
|---|---|---|---|
| 2,642,370 | 6/1953 | Parsons et al. | 161/96 |
| 2,949,394 | 8/1960 | Rodman | 161/227 |
| 3,000,772 | 9/1961 | Lunn | 161/203 |
| 3,060,068 | 10/1962 | Hannes | 161/248 |

Primary Examiner—William J. Van Balen
Attorneys—John A. McKinney and Robert M. Krone ABSTRACT: A panel for use as an acoustical panel or automobile headliner comprising a combination of resilient body of resin-bonded fiber and a covering decorative surfacing cloth united together with an intermediate thermoplastic sheet, and a method of forming such panel comprising superimposing the said components upon each other with a thermoplastic sheet intermediate thereof and compressing the assembly while heating to fuse the intermediate thermoplastic sheet to each of said body of resin binder with fiber and covering decorative surfacing cloth.

PATENTED NOV 16 1971
3,620,906
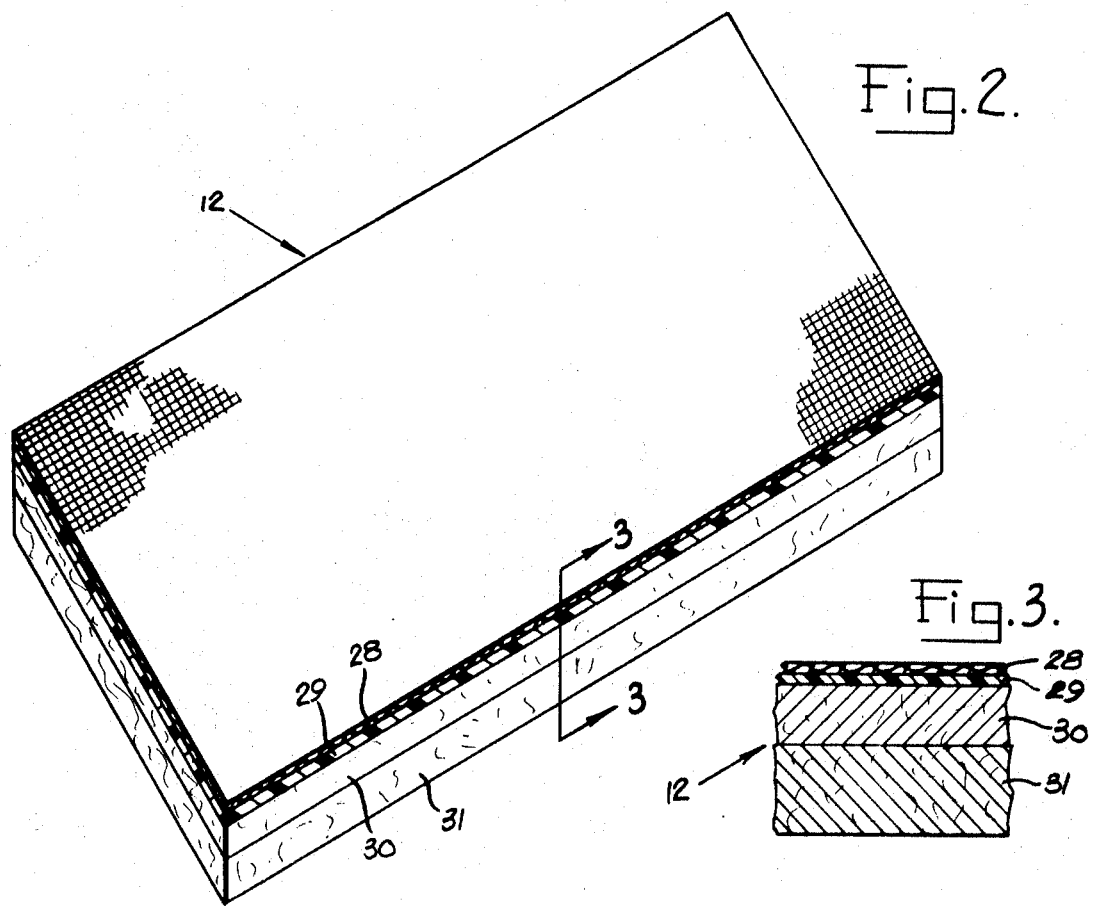
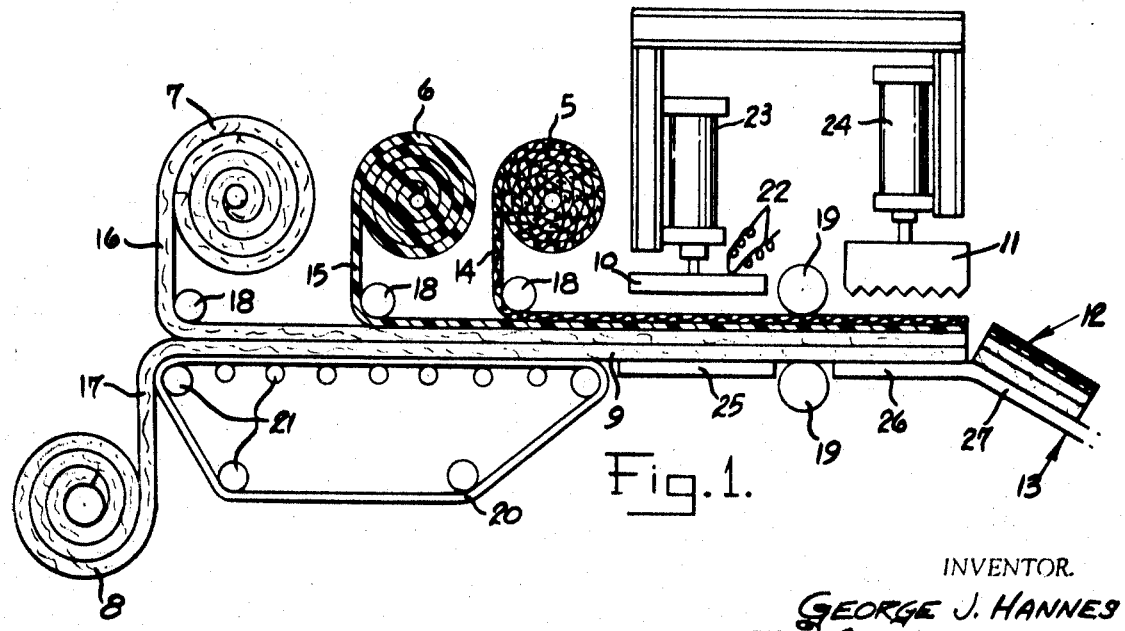
INVENTOR.
GEORGE J. HANNES
BY
John A. McKinney
ATTORNEY 3,620,906

GLASS FIBER LAMINATES AND METHOD

BACKGROUND OF THE INVENTION

This application is a continuation of U.S. Letters Pat. application Ser. No. 338,484, filed Jan. 17, 1964, now abandoned which is a continuation of U.S. Letters Pat. application Ser. No. 778,381, filed Dec. 5, 1958, now abandoned.

This invention relates to structural units comprised of laminated porous resin-impregnated glass fiber mats having protective covering layers. More particularly, the invention is directed to such structural members which are well adapted for use as automotive headliners and acoustical panels possessing a good degree of flexibility along with structural strength and dimensional stability as well as decorative and acoustical properties.

Structural units comprised of resin-bonded glass fiber mats having decorative and protective covering layers have found ready utility as automotive headliners, acoustical panels, and protective crash pads. Such structural members may be formed by bonding, under heat and pressure, glass fiber mats having an uncured thermosetting resin applied thereto to outer protective covering layers comprised of any of the well-known fabrics. Structures produced in accordance with former methods, although advantageous in many applications, have been found to have certain drawbacks. Specifically, the uncured thermosetting resin contained in the fibrous mat layer oftentimes would migrate to the surface of the protective covering layer during the laminating operation, and the finished structures themselves are oftentimes porous in nature and readily pick up dust or dirt particles which may be present in the air. Further, when such products have been cleaned with solvent type cleaners they have discolored to a certain extent insofar as the bonding resin present in the finished laminated article was susceptible to attack by the solvent due to the porosity of the protective fabric covering layer.

OBJECTS OF THE INVENTION

It is therefore a particular object of this invention to provide a glass fiber resin-bonded article having a decorative and protective covering layer which may be readily cleaned by solvent-type cleaners.

It is another object of this invention to provide a porous glass fiber resin-bonded structure having a decorative and protective outer covering layer which is substantially impervious to dust and dirt.

Still a further object of this invention is to provide a method of fabricating articles having the above-recited properties.

I have found that structural units comprised of resin-impregnated glass fiber mats having decorative and protective fabric outer layers bonded thereto, which units are substantially impervious to dust and dirt particles in the air and which may be readily cleaned with solvent-type cleaners, may be produced by interposing a thermoplastic sheet, such as polyethylene film, between a glass fiber mat or mass impregnated with a resinous binder consisting essentially of a thermosetting resin and the outer decorative and protective fabric layer, and subjecting the laminate to heat and pressure to produce an integrally united laminate structure. I have found the resin contained within the glass fiber mat will not migrate to the surface of the laminated article during the laminating operation when such an intermediate film is used as above described. Additionally, I have found that the acoustical properties of such structural units are comparable to those produced in accordance with prior art methods and, in many cases, may be improved in that, when using a polyethylene film in the laminating operation, the acoustical properties are readily controllable over a range of frequencies depending upon the final use of the article produced thereby.

DESCRIPTION OF THE DRAWINGS

The invention will be more fully understood by reference to the following detailed description and accompanying drawings wherein:

FIG. 1 is a diagrammatic illustration of a process for producing acoustical panels in accordance with my invention;

FIG. 2 diagrammatically illustrates a finished composite laminated acoustical panel; and FIG. 3 is a sectional view of the acoustical panel taken along the line 3—3 of FIG. 2.

SUMMARY OF THE INVENTION

By way of example, and not by way of limitation, there will be described herein in detail a process for producing a glass fiber acoustical panel in accordance with the method of this invention. Referring now to FIG. 1, wherein the process for the production of acoustical panels is diagrammatically illustrated, this process comprises unrolling the individual layers from rolls 5, 6, 7, and 8 respectively, in succession, one upon the other in the form of a four-ply mat 9, passing this mat 9 beneath a heated platen 10 where the individual layers of mat 9 are integrally laminated under heat and pressure, further passing the laminated layers beneath the cutting means such as plate 11, which severs the laminated layers into the desired-sized acoustical panels 12, and delivering the severed panels onto a suitable conveyor or system 13.

The individual rolls 5, 6, 7, and 8 are comprised of, respectively, a glass fabric 14, a polyethylene film 15, a glass fiber mat 16 impregnated with an adhesive or binder consisting essentially of an uncured thermosetting resin, and a cured resin binder impregnated glass fiber mat 17, which binder consists essentially of a thermosetting resin, respectively. The individual layers are intermittently advanced through the acoustical panel forming apparatus by means of drawing rolls, illustrated by the numerals 18 and 19, and belt 20, which in turn is driven by drawing rolls 21. The drawing rolls 18 and 19 and the belt 20 are regulated so as to form and convey a given length of mat at a given interval.

In a typical run, the polyethylene layer of film 15 is comprised of a sheet approximately 2 mils in thickness, the uncured binder-containing layer 16 is comprised of a ½-inch mat having about ¾ pounds per cubic foot density, and the cured resin-containing layer 17 is comprised of a 1-inch mat having about ½ pound per cubic foot density. The drawing rolls 18 and 19 and the endless belt 20 act to draw given lengths of mat 9 at predetermined intervals and to project given portions of mat 9 first directly beneath the heated platen 10 and then beneath the cutting plate 11. The heated platen 10, which is heated to approximately 350° F., as by electrical heating means 22, is suitably regulated by means of a hydraulic member 23 so that when the individual layers of mat 9 are presented thereunder by means of the drawing rolls 18 and the endless belt 20, the upper platen 10 is lowered onto the upper surface of mat 9 for approximately 12 seconds and under a pressure of approximately ½ pound per square inch. After the curing cycle, the now integrally laminated mat 9 is passed, with the assistance of upper and lower drawing rolls 19, beneath a suitably dimensioned cutting plate 11, which is in turn regulated by means of a hydraulic member 24. Hydraulic member 24 lowers the cutting plate 11 onto the laminated layers thus severing the composite acoustical panel 12 therefrom. Suitable support members 25 and 26 are positioned beneath the heated platen 10 and the cutting plate 11 respectively, with support member 26 terminating in a conveyor chute 27 onto which the severed panels are delivered.

During the curing operation, the binder consisting essentially of the uncured thermosetting resin contained in layer 16 is cured at the same time as mat 9 is compressed, thus bonding the fibers inter se firmly together into a composite relatively dense layer. Where layer 16 is originally approximately ½-inch thick prior to the curing operation, it is compressed, while being cured, to a thickness of about one-sixteenth to about one-eighth inch during the curing operation. The temperature imparted by the heated platen 10, during the curing operation also softens the polyethylene film 15 to cause the thermoplastic material to flow into a surface portion of both the adjacent fabric and fiber mass which in turn forms a bond with the outer glass fabric layer 14 and with curing thermosetting resin containing glass fiber layer 16. Glass fiber layer 17, the individual fibers of which are bonded by means of the adhesive consisting essentially of the cured thermosetting resin, retains its resiliency during lamination and, upon removal from beneath the platen 10, springs back to its original thickness. During the molding or laminating step, a certain amount of flow of the uncured resin in layer 16 also results at the interface of layers 16 and 17 and between the individual fibers of both layers and which, on curing, results in the formation of a firm bond between layers 16 and 17. A composite laminated structure integrally and firmly bonded throughout is thus produced.

Referring now to FIG. 2, wherein the acoustical panel 12 is shown in slightly enlarged form, the glass fabric is designated by the numeral 28, the polyethylene layers is designated by the numeral 29, the glass fiber layer which originally contains the uncured resinous binder is designated by the numeral 30 and the cured-resin impregnated glass fiber layer is designated by the numeral 31.

FIG. 3 is a view of the finished acoustical panel 12 taken along the line 3—3 of FIG. 2 showing individual layers 28, 29, 30, and 31 in section.

Although the glass fiber mats used in forming the laminated articles above described have relatively low densities, it will be readily evident to one skilled in the art that the properties of the panel 12 may be readily modified by using higher or lower density glass fiber mats when forming the laminate.

The resinous binder utilized in forming layers 16 and 17 may be varied between about 7 and 30 percent, although I have found that approximately 20 percent binder, based on the weight of the individual layer and distributed evenly throughout said layer, and principally at the fiber intersections, produces a firmly bonded structure. An adhesive consisting essentially of thermosetting resin is preferred in practicing the method of my invention, and preferably a phenol or melamine-formaldehyde condensation product is utilized.

The use of a polyethylene film as the intermediate thermoplastic film results in numerous advantages in the finished article insofar as polyethylene is a thermoplastic material which softens at approximately 228° to 234° F. The polyethylene film heat seals at approximately 250° F. thus establishing an integral bond at a temperature below the temperature at which ordinary fabric covering layers would be detrimentally affected. Additionally, the polyethylene film in the laminated article is both tough and flexible at room temperature and the absence of a plasticizer in the film results in excellent weathering characteristics in the finished article under normal use. Furthermore, polyethylene itself is insoluble in organic solvents at ordinary temperature so that the commercial type solvent cleaners customarily used in removing surface dirt from fabrics may be used without detrimentally affecting the appearance of the cleaned article.

Polyethylene films or sheets are available in cast, calendared, or extruded form and additionally are readily available in extruded form upon the fabric layer itself. Thus, the fabric used in forming the articles in accordance with the method of this invention may initially have the polyethylene film layer extruded thereon as an alternative to the use of separate fabric and polyethylene layers in the above-described laminating operation.

I have found that best results are obtained when the thickness of the polyethylene sheets is between 1 and 4 mils although thicknesses of ½ to 10 mils have been successfully utilized. Actually, I have found that by using thicknesses of more than 2 mils, the film of resultant articles formed in accordance with the method of my invention exhibit no porosity, i.e., the polyethylene film after the laminating or molding step exhibits no pinholes.

In some instances, I have discovered that it may be desirable to use polyethylene sheets having thicknesses of less than 2 mils. When such sheets are used in the laminating operation, the polyethylene film in the finished article is found to have a certain percentage of pinholes therethrough which may be desirable depending on the acoustical properties desired in the finished article. The pattern and the extent of the pinhole effect may be regulated by controlling the thickness of the polyethylene adhesive layer as well as the configuration of the laminating surface in contact with the fabric layer. As to the frequencies which are particularly affected by the above-described articles, wherein pinholes are present the highs are most effectively absorbed or attenuated while the continuous sheet of polyethylene in the finished article is most effective for low frequencies.

As pointed out above, the polyethylene utilized in the method of this invention may be in the form of sheets or the polyethylene may be extruded upon the surface of the covering fabric layer prior to lamination. A still further advantage has been found in utilizing colored polyethylene films. By coloring the polyethylene itself, prior to use in laminating, the overall appearance of the finished article can be vastly improved, especially where light colored fabrics are employed and where the color of the polyethylene adhesive layer is compatible therewith.

Although I have found that of the thermoplastic films polyethylene films are particularly well suited to the practice of my invention, I have also found that polypropylene films, which exhibit substantially the same desirable properties as the films of polyethylene, may be utilized equally as well.

Ordinarily "B" fiber is preferred for forming the glass fiber mats 16 and 17. "B" fiber has an average diameter size of approximately 3 microns and is readily adaptable for forming articles having the desired acoustical as well as structural properties. It will be readily evident to one skilled in the art, however, that glass fiber and other types of siliceous fibers having less or greater diameter size may be utilized equally as well and in fact, in some application, coarser or finer fibers might well be preferable.

The class of siliceous or glass fiber mat products covered by this invention may be further described, in inherent properties, in terms of percentage airspace and the flow characteristics. Specifically, the percentage airspace defines the amount of air present in a given volume of fiber mat. This is inherent in the product and is readily calculated by reference to the specific gravity of the glass fibers and binder, and the density of the products for the instant class of fiber mats the percentage airspace generally ranges from 95–98 percent, but may range from about 90 to 99 percent. It should be noted, however, the percentage airspace does not positively define the product, for various mat products may have the same airspace but may vary markedly in the size holes which provide the airspace. For the class of fibrous mat products covered by the instant invention, the airflow property generally ranges between 20 and 55 cu. ft./min./sq. ft. per 1 inch of thickness (at 1 inch of water), but may range from about 7 to about 100 cu. ft./min./sq. ft. per 1 inch of thickness. This is readily determinable from the density and fiber diameter of the mat. The amount of resin likewise contributes to the flow characteristics, however, its effect is nominal within the binder percentage range disclosed herein. Consequently, the instant product may be defined in terms of the inherent properties of the glass fiber mat portion thereof as having a glass fiber mat having a percentage airspace of between about 90 and 99 percent and a flow characteristic of between 7 and 100 cu. ft./min./sq. ft. of 1 inch thickness at 1 inch of water pressure.

Although the use of polyethylene film has been described above in connection with the production of a laminated glass fiber acoustical panel, it will be readily evident to one skilled in the art that the use of a polyethylene film, as well as a polypropylene film, as an adhesive layer is applicable to other types of laminated structures such as automobile headliners and crash pads wherein individual layers of resin bonded glass fiber mats along with decorative and protective outer surfaces are utilized. For example, in preparing a headliner in accordance with the method of my invention wherein two heated platens are utilized in the laminating step, the upper platen is heated to approximately 450° F. and the lower platen is heated to approximately 300° F. A three-ply mat comprised of outer layers of glass fiber fabric and a glass fiber mat having an uncured adhesive consisting essentially of a thermosetting resin applied thereto, and a sheet of polyethylene interposed between said outer layers is cured for about 2 minutes between the heated platens under a pressure of approximately 100 p.s.i., the glass fabric layer being in contact with the lower platen during the curing cycle. The platens are shaped so that the desired headliner configuration is imparted to the laminated article during the curing cycle.

The properties of the finished article may thus be varied considerably. In forming such articles in accordance with the method of my invention wherein only glass fiber mats having an uncured thermosetting resin applied thereto are utilized, the article thus produced has a greater overall density with resultant changed flexural and structural properties.

In any event, at least one glass fiber layer having an adhesive consisting essentially of an uncured thermosetting resin applied thereto must be utilized in the laminating step and must be positioned in contact with the thermoplastic sheet so as to provide a firm bond upon curing with said thermoplastic sheet. The use of an uncured layer is also necessary insofar as it provides, on curing under pressure, a relatively dense flexible structure having good dimensional stability.

Although the covering layer has been shown as being preferably formed from glass fibers, other fibers such as cotton and synthetics may be used in place of, or in combination with, the glass fibers in the fabric layer.

It will be understood that this invention is susceptible to modification and accordingly, it is desired to comprehend such modifications within this invention as may fall within the scope of the appended claims.

What I claim is:

1. A resilient, flexible, dimensionally stable, low-density laminate consisting essentially of:
 a. a covering layer of porous fabric,
 b. a resilient, flexible, dimensionally stable, low-density mass of compacted glass fibers bonded throughout at their intersections with between about 7 and about 30 percent by weight of cured binder distributed substantially evenly throughout the mass of fibers consisting essentially of a thermosetting resin, said bonded mass of compacted fibers having between about 90 and about 99 percent airspace and an airflow characteristic of between about 7 and 100 cubic feet/min./sq. ft./inch of thickness at 1 inch of water pressure; and
 c. an intermediate thermoplastic sheet integrally united with both the layer of porous fabric and fiber mass by being thermally bonded with surface portions thereof.

2. A laminate as described in claim 1 wherein the mass of glass fibers comprises a plurality of distinct layers of glass fibers with the layer of glass fibers contacting the thermoplastic sheet of the airspace and airflow characteristics given in claim 1 being of the greatest density, and wherein said layers of glass fibers are integrally joined by means of portions of said binder having been caused to flow between adjacent layers of said glass fiber.

3. A laminate as described in claim 1 wherein the intermediate sheet is polyethylene having a thickness of between ½ and 10 mils.

4. A method of forming a resilient, flexible, dimensionally stable, low-density laminated article comprising:
 a. laminating a composite structure consisting essentially of:
  1. a covering layer of porous fabric;
  2. a mass of glass fibers containing between about 7 and 30 percent by weight of an uncured adhesive distributed substantially evenly throughout the mass of fibers consisting essentially of a thermosetting resin, and
  3. an intermediate thermoplastic sheet,
 b. subjecting the composite structure to heat and pressure to cause:
  1. the thermosetting resin to cure, thereby bonding the fibers of the fibrous mass substantially evenly throughout at their intersections in a permanent resilient, flexible, dimensionally stable, low-density shape,
  2. the thermoplastic sheet to soften and to flow into a surface portion of both the adjacent fabric layer and the glass fiber mass to unite said fabric layer and said glass fiber mass to unite said fabric layer and said glass fiber mass integrally with said thermoplastic sheet; and
  3. the glass fiber mass to be characterized by between about 90 and about 99 percent airspace and a flow property of between about 7 and about 100 cubic feet/min./sq. ft./inch of thickness under 1 inch of water pressure, and
 c. thereafter removing the heat and pressure and permitting the thermoplastic sheet to set, whereby the fabric and fibrous mass are integrally joined by means of said thermoplastic sheet.

5. A method as defined in claim 4 wherein the mass of glass fibers comprises a plurality of distinct layers of glass fibers, at least one of which contains an initially cured adhesive consisting essentially of thermosetting resin, and at least one of which initially contains an uncured adhesive consisting essentially of thermosetting resin in contact with the thermoplastic sheet and which mass is compressed and set by said uncured resin, curing during said heat and pressure application to a density greater than its original density and the density of the layer containing the cured adhesive and to have the airspace and airflow characteristics given in claim 4.

6. A method as defined in claim 4 wherein the intermediate sheet is polyethylene between ½ and 10 mils thick.

7. An automobile headliner having a body of randomly arranged bonded fibers, said body being resiliently compressible, a colored surfacing fabric of fibrous glass and a continuous plastic film interlayer directly adhering the surfacing fabric to the body, said plastic film interlayer being between 2 and 4 mils in thickness and in a color compatible with that of the surfacing fabric.

8. A headliner for an automobile having a sound-insulating body of randomly arranged bonded fibrous glass, said body being resiliently compressible, a colored surfacing fabric and a continuous plastic film interlayer directly adhering the surface of the fabric to the body, said plastic film interlayer being a color compatible with that of the surfacing fabric.

9. A headliner for an automobile having a sound-insulating body of randomly arranged bonded fibers, said body being resilient and a continuous plastic film interlayer directly adhering the surface fabric to the body, said plastic film interlayer being between 2 and 4 mils in thickness.

10. A headliner for an automobile having a sound-insulating body of bonded fibers, a colored surfacing fabric of fibrous glass and a continuous plastic film interlayer directly adhering the surfacing fabric to the body, said plastic film interlayer being between ½ and 10 mils in thickness and in a color compatible with that of the surfacing fabric.

11. A method of forming an automobile headliner which comprises placing in overlying relation a surfacing fabric of fibrous glass, a continuous, imperforate thermoplastic interlayer of a compatible color with that of the surfacing fabric of the fibrous glass, a main insulating body of randomly arranged fibrous glass with a heat-curable binder dispersed therethrough, pressing the body to the final shape desired in the product and applying heat to cure the binder and to fuse the thermoplastic interlayer, said application of heat being controlled to fuse the thermoplastic interlayer to an extent where it flows into the interstices of the surfacing fabric while still retaining its continuous, imperforate nature.

12. A resilient, flexible, dimensionally stable, low-density laminate consisting essentially of:
 a. a covering layer of porous fabric,
 b. a resilient, flexible, dimensionally stable, low-density mass of compacted glass fibers bonded throughout at their intersections with between about 7 and about 30 percent by weight of a cured binder distributed substantially evenly throughout the mass of fibers consisting essentially of a thermosetting resin, said bonded mass of compacted fibers having between about 90 and about 99 percent airspace and an airflow characteristic of between about 7 and 100 cubic feet/min./sq. ft./inch of thickness at 1 inch of water pressure, and c. a perforate intermediate thermoplastic sheet integrally united with both the layer of porous fabric and the fiber mass by being thermally bonded with surface portions thereof.

13. A method of forming a resilient, flexible, dimensionally stable, low-density laminated article comprising:

a. laminating a composite structure consisting essentially of:
    1. a covering layer of porous fabric,
    2. a mass of glass fibers containing between about 7 and about 30 percent by weight of an uncured adhesive distributed substantially evenly throughout the mass of fibers consisting essentially of a thermosetting resin, and
    3. a perforate intermediate thermoplastic sheet, b. subjecting the composite structure to heat and pressure to cause:
    1. the thermosetting resin to cure, thereby bonding the fibers of the fibrous mass substantially evenly throughout at their intersections in a permanent resilient, flexible, dimensionally stable, low-density shape,
    2. the thermoplastic sheet to soften and to flow into a surface portion of both the adjacent fabric layer and glass fiber mass to unite said fabric layer and said glass fiber mass integrally with said thermoplastic sheet, and
    3. the glass fiber mass to be characterized by between about 90 and about 99 percent airspace and a flow property of between about 7 and about 100 cubic feet/min./sq. ft./inch of thickness under 1 inch of water pressure, and c. thereafter removing the heat and pressure and permitting the thermoplastic sheet to set, whereby the fabric and fibrous mass are integrally joined by means of said thermoplastic sheet.

* * * * *